United States Patent Office 3,275,288
Patented Sept. 27, 1966

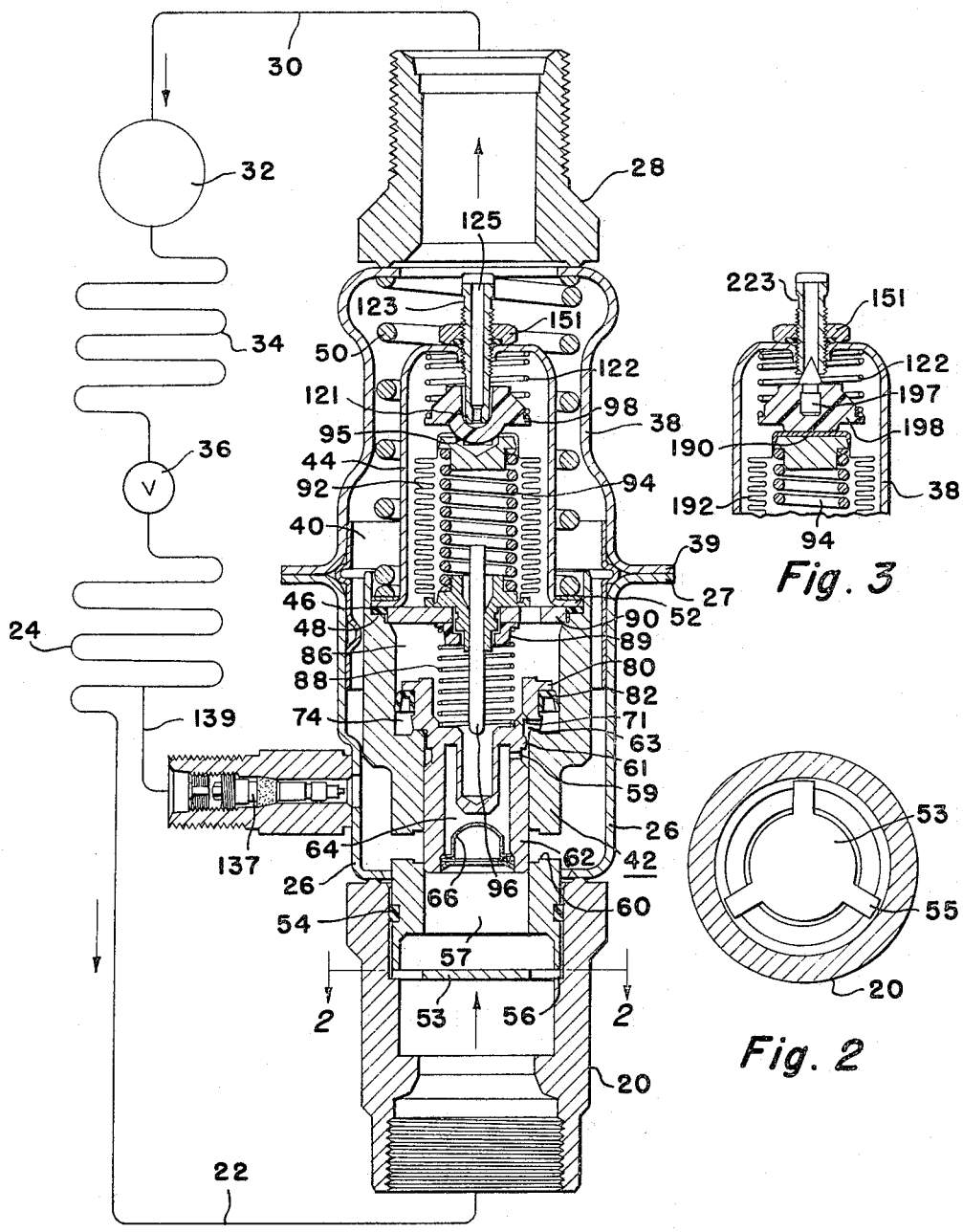

3,275,288
REFRIGERATING APPARATUS
John Weibel, Jr., Dayton, and Thomas C. Shuler, Jr., Trotwood, Ohio, assignors to General Motors Corporation, Detroit, Mich., a corporation of Delaware
Filed Sept. 1, 1964, Ser. No. 393,630
1 Claim. (Cl. 251—127)

This invention pertains in a general way to refrigerating apparatus and more particularly to flow control valves such as may be used to maintain a substantially constant pressure in a refrigerant evaporator or other fluid container.

In automotive air conditioners, to make the greatest possible use of the compact evaporator used, it is necessary to operate the evaporator at the coldest temperature obtainable without frosting. To accomplish this, suction line valves are used. We have found such suction line valves are occasionally subject to erratic behavior which may cause the evaporator pressure and temperature to be too high thereby failing to provide adequate cooling or to be too low causing frosting and a consequent decrease in air flow. The frosting and decrease in air flow may initially cause the air delivered to be too cold, but later may be found to be too small in volume and/or too warm. Some of the erratic behavior may be caused by abnormal slugs of liquid in the gas or vapor impinging directly on the valve member or entering the control chamber of the value.

It is an object of our invention to prevent the erratic behavior of suction line valves and similar control devices.

These and other objects are attained in the forms shown in the drawings in which the outer body is formed of a screw machine made inlet and outlet at the opposite ends between which are two sheet metal cup-shaped members abutted rim to rim, all of which are bonded together. A double cylinder and double piston valve arrangement is held by a spring in sealing engagement with the inlet. The double cylinder forms a part of an inner enclosure containing an evacuated bellows which operates a relief valve within the inner enclosure to control the pressure on one side of the double piston so as to control its opening and closing. The piston valve is provided with a leakage path into the inner enclosure.

To prevent slugs of liquid in the gas from impinging upon the double piston valve and also to prevent such slugs from entering the inner control enclosure and to break up such slugs, we provide a baffle in the form of a flat disc having an area slightly larger than the primary piston valve supported in the center of the inlet by narrow arms from the adjacent portion of the valve body. Two different forms of relief valve for the inner enclosure are shown. In the one form, the bellows is provided with a frusto spherical seat which receives a frusto spherical surface of a valve member which cooperates with a hollow screw extending through the enclosure and similarly provided with a frusto spherical valve seat cooperating with an inner frusto spherical cavity in the previously mentioned member. In the arrangement, all of the frusto spherical surfaces are arranged to be struck from the same center point so as to minimize erratic performance due to unsatisfactory seating. In a second form the evacuated bellows is provided with a flat surface which is held by a coil spring against the flat surface of a follower member which carries a needle valve adapted to seat upon the inner end of a hollow screw threaded through the inner enclosure. The baffle blocks slugs of liquid from entering the inner enclosure enclosing the control chamber by forcing the gas to flow around it. These features prevent erratic operation of the valve.

Further objects and advantages of the present invention will be apparent from the following description, reference being had to the accompanying drawings wherein a preferred embodiment of the present invention is clearly shown.

In the drawings:

FIG. 1 is a sectional view through a valve embodying one form of our invention together with a diagrammatic illustration of a refrigerating system connected to the valve;

FIG. 2 is a transverse sectional view showing the baffle taken along the line 2—2 of FIG. 1;

FIG. 3 is a fragmentary sectional view showing a modified form of relief valve for the inner enclosure.

Referring now to the drawings there is shown an inlet fitting 20 of steel made by a screw machine and connected by the suction conduit 22 to a refrigerant evaporator 24. This fitting 20 is bonded by welding through the use of an annular welding projection to the lower flanged cup-shaped member 26 of sheet steel. At the opposite end, the outlet fitting 28 also of steel and made by a screw machine is connected by the second portion of the suction conduit 30 to the inlet of a motor compressor unit 32. This motor compressor unit 32 delivers compressed refrigerant to the condenser 34 from which liquefied refrigerant flows under the control of the liquid flow control valve or device 36 to the evaporator 24. The outlet fitting 28 is provided with an annular welding projection by which it is bonded and sealed by welding to the inverted sheet steel cup member 38. The cup-shaped members 26 and 38 are aligned by an inner thin sheet steel sleeve 40 and fastened and sealed together at the two adjacent flanges 27 and 39 by electric welding. The sleeve 40 also blocks any weld flash which may occur when the two adjacent flanges 27 and 39 are electrically welded together.

Within the cup-shaped members 26 and 38 and co-axially aligned with the fittings 20 and 28 is a first inner enclosure formed of the double cylinder member 42 and the inner inverted cup-shaped member 44 having its lower flange resting in sealing engagement with the O-ring seal 46 which in turn rests upon the inner flange 48 at the top of the double cylinder member 42. The first enclosure is held in place by a compression type coil spring 50 having its upper end supported upon the inturned flange at the top of the upper inverted cup-shaped member 38 and its lower end supported on a thin locking retainer bearing on the out-turned flange 52 of the inverted cup-shaped member 44 which bears upon the O-ring 46. The force of the spring 50 is transmitted through the flange 48 and the double cylinder member 42 to the disc-like baffle 53 having three legs or arms 55 resting upon a shoulder 56 in the inlet fitting 20. The circular baffle 53 is aligned with, but is slightly larger than the entrance opening 57 in the double cylinder 42. Sufficient space is provided around the baffle within the inlet for the free flow of gas.

This arrangement holds the baffle 53 in alignment with, but spaced from the inlet opening 57 within which slides the smaller portion 62 of the double piston. This smaller portion 62 slides within the entrance or smaller cylinder of the double cylinder 42. The piston 62 is slightly smaller in cross sectional area and is aligned with the central disc portion of the baffle 53. The double cylinder 42 is also provided with an annular groove containing an O-ring seal 54 providing a seal between the double cylinder 42 and the inlet fitting 20 as illustrated in FIG. 1. The interior 64 of the double piston 62 is guarded by a hat-shaped screen 66. The piston 62 is also provided with a radial bore 59 through which gas from the inlet fitting 20 can pass through the screen 66 and through the interior 64 of the smaller diameter piston valve 62. The pressure in the inlet fitting 20 normally will be greater than the pressure in the outlet fitting 28, resulting in a pressure differential from the inlet fitting 20 to the outlet fitting 28 causing the flow of gas upon the uncovering of the ports 60 in the double cylinder 42 through the ports 60 around the first inner enclosure to the outlet 28. The small piston valve 62 is provided with a leakage port through the radial bore 59 and around the annular projection 61 to the notched portion 63 of the upper piston 80. The upper piston 80 is provided with a piston ring 82 which is U-shaped in cross section and made of a suitable plastic such as nylon or polytetrafluoroethylene. The notch 63 extending from the dashpot chamber 74 connects with an aperture 71 extending diagonally upwardly at the shoulder between the upper piston 80 and the lower piston 62 discharging into the interior of the upper cylinder above the piston 80. However, the main flow through the valve is accomplished by the upward movement of the lower piston 62 sufficient to uncover the ports 60 of the double cylinder 42.

The piston 62 is normally urged downwardly toward its closed position closing the ports 60 by a light compression type coil spring 88 having upper end exerting its force against a plastic spring retainer 89 in the inner control chamber 86 and its lower end resting on the shoulder between the smaller and the larger pistons 62 and 80. This annular chamber 74 together with the orifice 63 serves as a dashpot to prevent fluctuations of the piston 62. This spring retainer 89 is retained by a perforated plate 90. The perforated plate 90 is held in place and sealed by the sealing ring 46 as well as the spring 50.

Above the perforated plate 90 is a bellows retainer which is concentric about the evacuating tube 96 through which the bellows 92 is evacuated. The bellows 92 contains an inner expansion spring 94 which tends to prevent the bellows 92 from collapsing until the selected pressure such as 30 pounds per square inch is exceeded. The bellows 92 constitutes a second inner enclosure. The upper end of the bellows 92 is provided with a frusto spherical seat 95 which has its surface struck from a point 121 situated in the bottom of the hollow screw 123 having a central bore 125. The hollow screw 123 extends within the valve member 98 having a frusto spherical lower surface and an inner recess having a frusto spherical bottom surface receiving the lower end of the screw 123 all of which are struck from the point 121 as the center of a radius. The member 98 is spring pressed onto the seat 95 by the coil spring 122 which extends between the top of the inverted cup-shaped enclosure 44 and the flange at the edge of the valve member 98. The hollow screw 123 is locked in place by the lock nut 151. Should there be any slight misalignment, this can be accommodated by the lateral flexibility of the bellows 92.

With this arrangement, when the motor compressor unit 32 operates, evaporated refrigerant will be drawn from the outlet 28 through the suction conduit 30 and be compressed within the refrigerant compressor unit 32 from which the compressed refrigerant will be discharged into the condenser 34. This compressed refrigerant will be condensed in the condenser 34 and flow under the control of the valve 36 into the evaporator 24 where it will evaporate under reduced pressure and flow through the suction conduit 22 to the inlet 20. The piston valve 62 will normally assume a variable position partially covering the ports 60 an amount sufficient to keep the pressure within the inlet 20 at the selected control pressure such as 30 pounds per square inch.

At this pressure, this piston valve 62 will be pushed upwardly against the force of the spring 88. The gas which leaks through the port 59 past the annular ridge 61 and through the notch 63 and the port 71 into the interior of the inner enclosure will apply substantially the same pressure to the bellows 92 through the ports in the disc 90. This will cause the bellows 92 to collapse slightly against the force of the inner spring 90 so as to permit a flow of gas around the bellows 92 and the valve member 98 into the entrance of the hollow screw 125 through which the gas will flow to the outlet 28. The opening of the interior of the hollow screw 123 will reduce the pressure within the first inner enclosure comprising the cup-shaped member 44 and the double cylinder member 42 to allow the piston valve 62 to open and allow flow through the slots 60 and around the outside of the double cylinder member 42 and the upper inverted cup-shaped member 44 to the outlet 28. Whenever the pressure is reduced at the inlet 20 and consequently within the first inner enclosure, the valve member 98 will close the bottom of the hollow screw 123 to allow the pressure to build up within the inner enclosure above the piston 62 so as to overcome the pressure on the bottom of the piston 62 with the aid of the spring 88 so as to cause it to move downwardly sufficiently to close the ports 60 to maintain the selected minimum pressure in the evaporator 24.

The bottom of the evaporator 24 is provided with drain conduit 139 connecting with a check valve 137 connecting through the wall of the lower cup-shaped member 26 with the space surrounding the double cylinder member 42. Whenever the suction is high within the outlet fitting 28, lubricant and refrigerant will be removed from the evaporator 24. However, under certain load conditions, slugs of liquid refrigerant and lubricant may escape from the evaporator 24 through the suction conduit 22 and would impinge against the bottom of the piston valve 62 for the baffle 53. The baffle 53 will absorb the kinetic energy or the momentum of the gas and particularly the slugs of liquid so that their kinetic effect upon the piston valve 62 will be minimized. Furthermore, by the impingement by the slugs of liquid upon the baffle 53, the slugs will be broken up and diverted through the ports 60 so as to minimize the possibility of them entering the interior of the cylinder 42 and gaining access to the chamber 86. Thus, through the arrangement of the baffle 53 and the concentric spherical arrangement of the seating surfaces of the hollow screw 123 and the member 98 as well as the top of the bellows 92, the erratic operation of the valve is thus prevented.

In FIG. 3 there is shown a modified form of relief valve in which the modified form of bellows 192 is provided with a flat top surface 190 upon which rests the bottom flat surface of the plastic spring retainer 198. These two flat surfaces are held together by the coil spring 122 extending from the spring retainer 198 to the inverted cup shaped member 38. The plastic spring retainer 198 has a conically pointed needle valve 197 concentrically fixed therein. This needle valve cooperates with the lower end of the hollow screw 223 having an inner cone-shaped lower seat. By the engagement of the needle valve 197 with this seat, the spring retainer 198 can be shifted laterally relative to the top of the bellow 192 by reason of the two flat surfaces in contact with each other. The top of the bellows is also universally flexible to a limited extent. This assures good seating between the needle valve 197 and the bottom of the hollow screw 223. Both of the hollow screws 123 and 223 may be adjusted to vary the pressure maintained by the suction line valve. The needle type valve illustrated in FIG. 3 also prevents erratic operation of the valve and assures that the selected pressure is maintained in the evaporator 24.

While the embodiment of the present invention as herein disclosed, constitutes a preferred form, it is to be understood that other forms might be adopted.

What is claimed is as follows:

A flow control device for a combined gas and liquid fluid including a body having an inlet and an outlet, a movable piston valve member of a selected circular area substantially coaxially aligned with said inlet, said body being provided with a stationary valve seat member cooperating with said movable piston valve member to control the flow of fluid through said inlet, a baffle located transversely relative to said inlet between said inlet and said movable valve member and having a central substantially imperforate flat circular disc portion of an area substantially the same as and concentric with the selected area of said piston valve member substantially coaxially aligned with said piston valve member for minimizing the effect of the momentum of the fluid upon the movable valve member, said baffle being provided with a plurality of outwardly extending narrow support arms supported by said body, said body having a shoulder abutting and supporting one side of said arms of said baffle, said seat member for said piston valve member abutting the opposite side of said arms for holding in place said baffle, said narrow support arms holding said central flat circular disc portion spaced a substantially uniform distance away from adjacent portions of said valve body substantially throughout the periphery of said flat circular disc portion sufficient to provide large enough openings between said support arms to prevent restriction of the area of flow as compared to the area of flow between the valve member and said seat member.

References Cited by the Examiner

UNITED STATES PATENTS

| | | | |
|---|---|---|---|
| 1,173,259 | 2/1916 | Greenlaw et al. | 251—127 X |
| 1,310,560 | 7/1919 | Cook | 137—436 X |
| 1,812,916 | 7/1931 | Zerk | 138—42 X |
| 1,985,770 | 12/1934 | Edwards | 137—510 |
| 2,326,825 | 8/1943 | Bucknam | 137—510 X |
| 3,182,681 | 5/1965 | Gallo | 137—490 X |

FOREIGN PATENTS 482,593  4/1938  Great Britain.

M. CARY NELSON, *Primary Examiner.*

MARTIN P. SCHWADRON, *Examiner.*

S. SCOTT, *Assistant Examiner.*